H. W. McCLELLAN & O. W. HANSON, Jr.
CLAMP FOR HOLDING PISTON RINGS WHEN REMOVING PISTONS.
APPLICATION FILED OCT. 16, 1914.
1,275,953.
Patented Aug. 13, 1918.
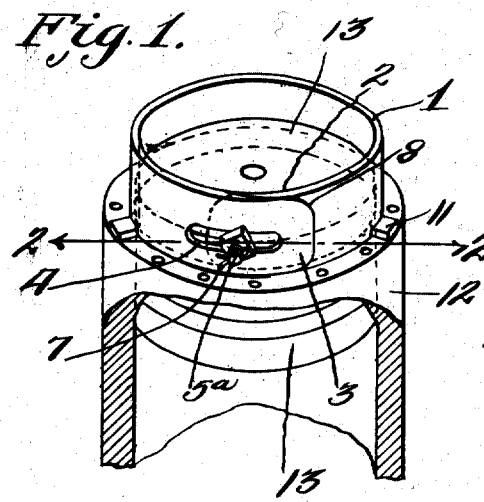
Fig. 1.
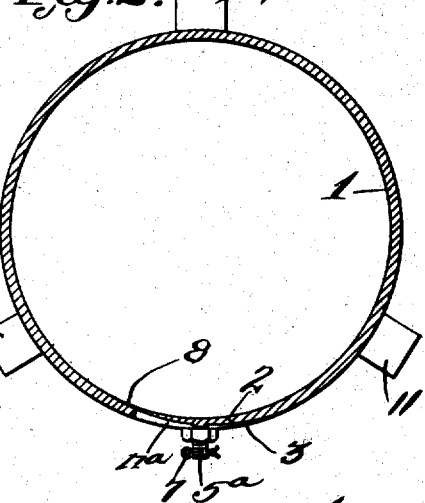
Fig. 2.
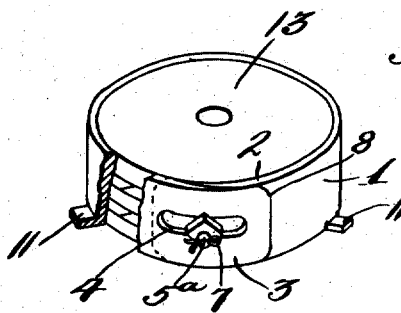
Fig. 3.
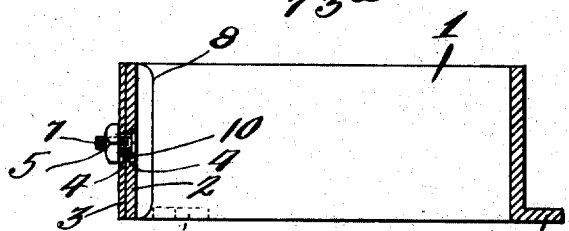
Fig. 5.
Fig. 4.
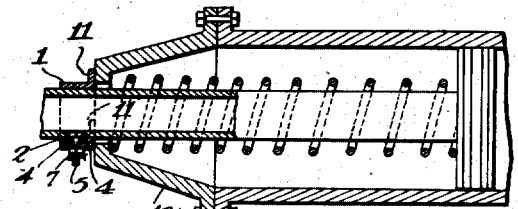
Fig. 6.
Witnesses
Inventor
H. W. McClellan and
O. W. Hanson Jr.
By D. Swift &Co.
Their Attorneys

UNITED STATES PATENT OFFICE.

HARRY W. McCLELLAN AND OSCAR W. HANSON, JR., OF ALTOONA, PENNSYLVANIA.

CLAMP FOR HOLDING PISTON-RINGS WHEN REMOVING PISTONS.

1,275,953.

Specification of Letters Patent. Patented Aug. 13, 1918.

Application filed October 16, 1914. Serial No. 866,958.

*To all whom it may concern:*

Be it known that we, HARRY W. McCLELLAN and OSCAR W. HANSON, Jr., citizens of the United States, residing at Altoona, in the county of Blair and State of Pennsylvania, have invented a new and useful Clamp for Holding Piston-Rings when Removing Pistons; and we do hereby declare the following to be a full, clear, and exact description of the invention, such as will enable others skilled in the art to which it appertains to make and use the same.

This invention relates to a clamp for holding piston rings on the piston while removing the same.

In removing pistons from the cylinder the rings tend to spring outwardly, and then become detached, and much time and labor is lost in holding the rings in place when reinserting the piston in the cylinder, therefore the object of the present invention is to provide a clamp designed to surround the piston as it is removed, to hold the rings securely in place, especially while the piston is undergoing repairs and the like.

Another object of the invention is to protect the piston rings from becoming corroded, and in cases where a clamp could not be secured on account of the piston sleeve being bent over, this clamp will eliminate this defect.

Another object of the invention is the provision of a clamp having overlapping ends provided with slot and bolt connections, thereby rendering the clamp adjustable, so as to fit pistons of different sizes.

Another object of the invention is the provision of means on the clamp, which contact with the peripheral edge of the cylinder or the non-pressure head, so as to prevent the cylinder or non-pressure head from slipping over the clamp.

In practical fields, the details of construction may necessitate alterations, falling within the scope of what is claimed.

The invention comprises further features and combination of parts, as hereinafter set forth, shown in the drawings and claimed.

In the drawings:—

Figure 1 is a view in perspective showing the end of a cylinder, the piston in the act of being removed and the clamp just partially slipped on the piston, the lugs thereof engaging the peripheral edge of the cylinder.

Fig. 2 is a longitudinal sectional view on line 2—2 of Fig. 1.

Fig. 3 is a perspective view of the piston entirely removed and the clamp thereon to prevent the piston rings from displacement.

Fig. 4 is a detail view of the clamp.

Fig. 5 is a sectional view through the clamp as applied to a piston, showing the head of the bolt countersunk in the underlapping part of the clamp.

Fig. 6 is a sectional view, parts in elevation, showing the band on a piston rod of a pressure cylinder, to prevent the non-pressure head 4ª from slipping over the band.

Referring more particularly to the drawings, 1 designates a metallic band having its ends overlapping to form the clamp. The overlapping ends 2 and 3 are provided with registering elongated slots 4, through which a bolt 5 extends, as shown in Figs. 4 and 5. However, in Figs. 1 to 3 the overlapping end 3 is provided within an elongated slot, and the screw-threaded bolt 5ª forms an integral part of the underlapping end 2, said integral threaded bolt passing through the elongated slot 4ª of the overlapping end 3, and as shown in all the figures the bolt is provided with a nut, for clamping the overlapping ends together in adjusted positions. By the provision of said slots or slot the clamp may be used upon pistons of different sizes. A cotter pin 7 passes through an aperture in the bolt, to prevent the nut from being entirely removed from the bolt. It will be observed that the extreme ends of the overlapping parts or ends 2 and 3 have round or curved edges, as shown at 8, and also said overlapping ends or portions taper in thickness, as shown, thereby enabling the clamp to neatly fit the piston.

In Figs. 4 and 5 it will be observed that the head of the bolt is extremely flat, and is countersunk in a recess 10 of the underlapping part of the band, so that the clamp will neatly fit the piston, and avoid the head of the bolt from acting as an obstruction.

One edge of the clamp is provided with integral laterally extending lugs 11, which engage the peripheral edge of the cylinder 12, that is, when the head of the cylinder is removed, so as to prevent the cylinder from slipping over the clamp, as shown in the drawings.

When the piston 13 is removed and the clamp applied, the same acts to prevent the piston rings from expanding and becoming detached, and at the same time prevent corrosion of the rings while the piston is under repairs. When inserting the piston said lugs are disposed in contact with the peripheral edge of the cylinder, and the band or clamp is slightly loosened, to a degree hardly perceptible to the naked eye, then the piston is readily inserted without the rings expanding or preventing the movement of the piston as it enters the cylinder.

The invention having been set forth, what is claimed as new and useful is:—

1. A device as set forth comprising a metallic strap bent to form an annular band, one end overlapping the other, one of said ends having an elongated slot, the other end carrying a bolt passing through said slot and provided with a nut to adjustably connect said overlapping ends, one of the peripheral edges of the band having a plurality of integral lugs, extending laterally and designed to lie in the path of and engage the end of a non-pressure head of a pressure cylinder, to prevent said non-pressure head from slipping over said band.

2. An article of manufacture as set forth, comprising a metallic strap bent to form an annular band, one end overlapping the other, both ends being tapered whereby said ends may overlap, one of said ends having an elongated slot, a bolt carried by the other end and passing through said slot, the head of the bolt being countersunk in the inner face of said other end, means adapted to be adjustably set up on said bolt to adjustably connect said overlapping ends, a plurality of lugs integrally connected to one of the peripheral edges of the band, said lugs extending laterally and adapted to lie in the path of and engage the end of a non-pressure head of a pressure cylinder to prevent said non-pressure head from slipping over said band.

In testimony whereof we have signed our names to this specification in the presence of two subscribing witnesses.

HARRY W. McCLELLAN.
OSCAR W. HANSON. Jr.

Witnesses:
CALVIN B. DILLING,
J. L. HAFFLY.

Copies of this patent may be obtained for five cents each, by addressing the "Commissioner of Patents, Washington, D. C."